United States Patent
Willcock et al.

(10) Patent No.: US 10,846,481 B2
(45) Date of Patent: Nov. 24, 2020

(54) METHOD AND SYSTEM FOR BRIDGING DISPARATE PLATFORMS TO AUTOMATE A NATURAL LANGUAGE INTERFACE

(71) Applicant: FinancialForce.com, Inc., San Francisco, CA (US)

(72) Inventors: Stephen Paul Willcock, Harrogate (GB); Matthew David Wood, Leeds (GB)

(73) Assignee: FinancialForce.com, Inc., San Francisco, CA (US)

( * ) Notice: Subject to any disclaimer, the term of this patent is extended or adjusted under 35 U.S.C. 154(b) by 115 days.

(21) Appl. No.: 16/256,069

(22) Filed: Jan. 24, 2019

(65) Prior Publication Data

US 2020/0004824 A1   Jan. 2, 2020

Related U.S. Application Data

(60) Provisional application No. 62/692,587, filed on Jun. 29, 2018.

(51) Int. Cl.
*G06F 40/30* (2020.01)

(52) U.S. Cl.
CPC .................. *G06F 40/30* (2020.01)

(58) Field of Classification Search
CPC ........................................ G06F 40/30
USPC ......................................... 704/9
See application file for complete search history.

(56) References Cited

U.S. PATENT DOCUMENTS

| | | | | |
|---|---|---|---|---|
| 6,449,643 | B1 * | 9/2002 | Hyndman | G06F 21/629 |
| | | | | 709/223 |
| 8,122,367 | B2 * | 2/2012 | Krieger | G06Q 10/10 |
| | | | | 715/764 |
| 8,892,446 | B2 * | 11/2014 | Cheyer | G06N 3/006 |
| | | | | 704/275 |
| 8,964,298 | B2 * | 2/2015 | Haddick | H04N 7/15 |
| | | | | 359/630 |
| 9,189,753 | B2 * | 11/2015 | Morley | G06F 9/541 |
| 9,501,585 | B1 * | 11/2016 | Gautam | G06F 16/26 |
| 9,817,439 | B2 * | 11/2017 | Gosieski, Jr. | G06F 1/163 |
| 10,110,716 | B2 * | 10/2018 | Lim | H04W 80/00 |
| 10,671,428 | B2 * | 6/2020 | Zeitlin | G06F 3/167 |

* cited by examiner

*Primary Examiner* — Susan I McFadden
(74) *Attorney, Agent, or Firm* — Kokka & Backus, PC

(57) ABSTRACT

Presented here is a system and method to bridge the gap between the disparate platforms, and to allow the user to interface with the disparate platforms using a natural language interface. The system can improve user interface for electronic devices because the user does not have to switch between the disparate platforms. Instead, the user can interact with the disparate platforms through a single natural language interface. The disparate platforms, some of which may not have a natural language user interface, can be enabled to interact with the user through the natural language interface when the system interfaces between a natural language processing platform and the remainder of the disparate platforms.

20 Claims, 14 Drawing Sheets

Provide a multi-platform management system configured to manage communications among multiple platforms, the communications configured to cause the multiple platforms to perform a platform-specific function.
202

Receive, from a groupware platform, an image via an event API of the multi-platform management system.
204

Provide the image to an image processing platform to cause the imaging platform to return a label and image text, the provided image conforming with protocols of the image processing platform.
206

Query a human capital management (HCM) platform with the label and image text to cause the HCM platform to return an event associated with the label and image text.
208

Provide the associated event to the groupware platform to cause the groupware platform to generate a message indicative of the associated event for an interactive chat.
210

*FIG. 2*

Provide a multi-platform management system configured to manage communications among multiple platforms, the communications configured to cause the multiple platforms to perform a platform-specific function.
302

Receive, from a groupware platform, a communication comprising text via an event API of the multi-platform management system.
304

Provide the text to a natural language processing (NLP) platform to cause the NLP platform to return a parsed data structure indicative of a meaning of the text, the provided text conforming with protocols of the NLP platform.
306

Query a human capital management (HCM) platform with the text meaning to cause the HCM platform to return an event associated with the text meaning.
308

Provide the associated event to the groupware platform to cause the groupware platform to generate a message indicative of the associated event for an interactive chat.
310

METHOD AND SYSTEM FOR BRIDGING DISPARATE PLATFORMS TO AUTOMATE A NATURAL LANGUAGE INTERFACE

CROSS-REFERENCE TO RELATED APPLICATIONS

This application claims priority to the U.S. provisional patent application Ser. No. 62/692,587 filed Jun. 29, 2018, titled "METHOD AND SYSTEM FOR BRIDGING CLOUD PLATFORMS TO AUTOMATE A NATURAL LANGUAGE INTERFACE," which is incorporated herein by reference in its entirety.

TECHNICAL FIELD

The present application is related to natural language interfaces, and more specifically to methods and systems that bridge disparate platforms to automate natural language interfaces.

BACKGROUND

Currently, the user desiring to perform various functions, such as making a timecard entry, submitting an expense report, requesting time off, etc., has to interact with multiple disparate platforms that cannot communicate with each other, and that have different interfaces. The interfaces are different, and the user has to learn each interface individually.

SUMMARY

Presented here is a system and method to bridge the gap between the disparate platforms, and to allow the user to interface with the disparate platforms using a natural language interface. The system can improve user interface for electronic devices because the user does not have to switch between the disparate platforms. Instead, the user can interact with the disparate platforms through a single natural language interface. The disparate platforms, some of which may not have a natural language user interface, can be enabled to interact with the user through the natural language interface when the system interfaces between a natural language processing platform and the remainder of the disparate platforms. This type of natural language interface can be beneficial for devices with small screens because the user does not have to interact with a device through a set of barely visible menus but can interact with the electronic device through natural language interface.

BRIEF DESCRIPTION OF THE DRAWINGS

FIG. 2 illustrates an example method performed using the multiplatform management system.

FIG. 3 illustrates another example method performed using the multiplatform management system.

DETAILED DESCRIPTION

Bridging Disparate Platforms

Presented here is a system and method to bridge the gap between the disparate platforms, and to allow the user to interface with the disparate platforms using a natural language interface. The system can improve user interface for electronic devices because the user does not have to switch between the disparate platforms. Instead, the user can interact with the disparate platforms through a single natural language interface. The disparate platforms, some of which may not have a natural language user interface, can be enabled to interact with the user through the natural language interface when the system interfaces between a natural language processing platform and the remainder of the disparate platforms. This type of natural language interface can be beneficial for devices with small screens because the user does not have to interact with a device through a set of barely visible menus but can interact with the electronic device through a natural language interface.

The disclosed technique includes an automated conversational interface configured to provide access to features on disparate cloud platforms. A multiplatform management system can bridge communications between disparate cloud computing platforms including, for example, a groupware platform, a natural language processing (NLP) platform, an image analysis platform, and a human capital management (HCM) platform. The multiplatform management system translates protocols from one platform to another to enable cross-platform communication, and routes communications to the appropriate platform.

The multiplatform management system can be used to leverage the best features from various platforms to facilitate a single task. For instance, the multiplatform management system can be used to enable a smart, conversational interface on a groupware platform by leveraging NLP analysis tools on an NLP platform and company information from an HCM platform. In another example, the multiplatform management system can be used to automate reimbursements in a groupware platform by leveraging image analysis tools in an image analysis platform and company information from an HCM platform. By seamlessly bridging disparate platforms, the multiplatform management system integrates disparate cloud platforms enabling the platforms to perform tasks together that they are currently incapable of performing alone.

Figure 1A:
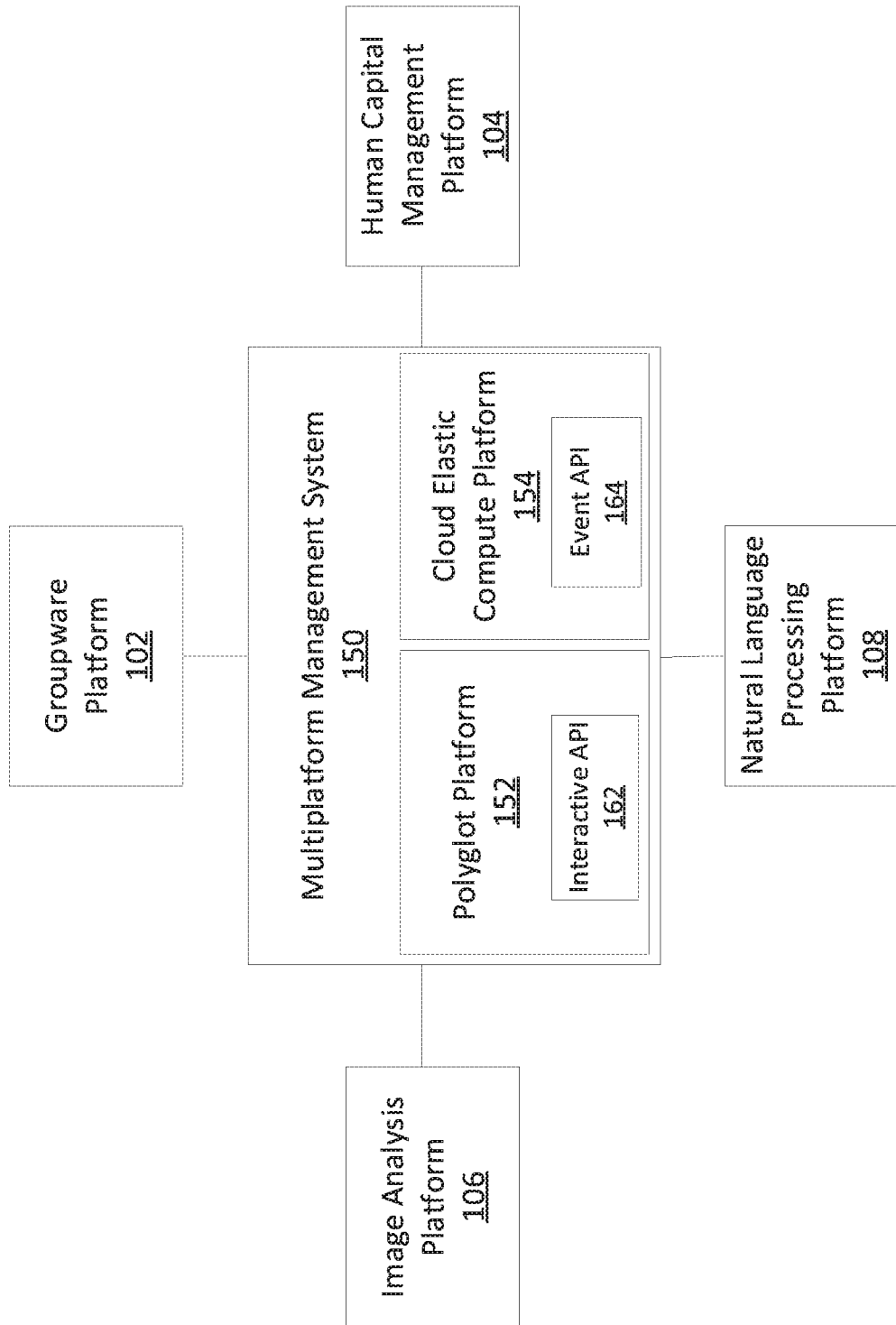
FIG. 1A illustrates a multiplatform management system 150 architecture, according to one embodiment.

FIG. 1A illustrates a multiplatform management system 150 architecture, according to one embodiment. The multiplatform management system 150 includes a polyglot platform 152 and a cloud elastic compute platform 154. Additional platforms 102, 104, 106, 108 can interface with the multiplatform management system 150. The additional platforms 102, 104, 106, 108 can be disparate platforms, incapable of communicating with each other.

The polyglot platform 152 supports several programming languages. The polyglot platform 152 can support programming languages including, for example, Java, Node.js, Scala, Clojure, Python, PHP, Go, Ruby, or any combination thereof. The polyglot platform can include application containers (e.g., dynos) that are spread across a grid consisting of several servers. Application containers are isolated, virtualized UNIX containers. The polyglot platform 152 includes an interactive application programming interface (API) 162. The interactive API 162 is configured to receive and transmit communications with cloud platforms in multiple programming languages. The interactive API 162 can receive communication from a first platform in a first programming language, and transmit the communication to a second platform in a second programming language consistent with protocols of the second platform.

The polyglot platform 152 selects a target platform for communication transmission in response to a content of a received communication from another platform. The polyglot platform translates the communication from a first programming language to a second programming language based on known or predicted protocols of the target platform.

The cloud elastic compute platform 154 responds to events and automatically manages computing resources triggered by detected events. The cloud elastic compute platform 154 simplifies building smaller, on-demand applications that are responsive to events and new information. In an embodiment, the cloud elastic compute platform 154 can utilize event API 164 to detect an event based on content of a communication received from a groupware platform 102. For example, a first event type can be detected if the received communication includes an image and a second event type can be detected if the received communication includes only text.

Based on the detected event type, the cloud elastic compute platform 154 can select a cloud platform for transmission of a communication. For example, if a first event type is detected, an image analysis platform 106 can be selected for transmission of a communication. A communication can be encoded with protocols consistent with the image analysis platform 106 via the polyglot platform 152. In another example, if a second event type is detected, a natural language processing (NLP) platform 108 can be selected for transmission of a communication. A communication can be encoded with protocols consistent with the NLP platform 108 via the polyglot platform 152.

In an embodiment, an enterprise can utilize the multiplatform management system 150 to execute human resource requests through a third-party groupware platform. The enterprise can control a human capital management (HCM) platform having enterprise data. The enterprise data can include, for example, a listing of employees, holiday entitlements for employees, expense entitlements for employees, relationships among employees (e.g., management structure, work divisions, etc.), sales information, client information, or any combination thereof. The HCM platform 104 can be a cloud computing platform that is separate and incompatible with other cloud computing platforms such as, for example, groupware platform 102, image analysis platform 106, and natural language processing platform 108. Thus, the enterprise data within HCM platform 104 is siloed from various other cloud computing platforms.

The multiplatform management system 150 can be used to bridge communications between HCM platform 104 and various other platforms, for example, to facilitate an automated conversational interface on groupware platform 102 configured to interpret various data inputs (e.g., natural language text and images) and select tasks to perform based on the data inputs.

For example, an automated conversational interface (e.g., a chat bot) can be implemented in the groupware platform 102 to receive inputs from one or more users. For example, a user can send a message directly to a chat bot or a chat bot can be running in the background during a user-to-user conversation. The chat bot directs the communication to the multiplatform management system 150. The multiplatform management system 150 uses the cloud elastic compute platform 154 to determine an event type associated with the communication.

The determined event type is used to select which cloud platform to leverage to perform a particular task. For example, if the communication includes natural language text indicative of a holiday request, the multiplatform management system 150 generates a communication consistent with protocols of the NLP platform 108. The generated communication is transmitted to the NLP platform 108 to cause the NLP platform 108 to respond with a context and/or meaning of the natural language text (e.g., holiday request).

The cloud elastic compute platform 154 of the multiplatform management system 150 analyzes the response from the NLP platform 108 to generate a message for the HCM platform 104. The generated message can, for example, query information regarding a holiday entitlement associated with the user of the groupware platform 102. Upon receiving a response from the HCM platform 104 indicating that the user is entitled to the requested holiday, the multiplatform management system 150 generates and transmits a communication requesting to reserve a holiday for the user for the requested dates to cause the HCM platform 104 to update an employee holiday database.

In another example, a user of the groupware platform 102 can send a message including an image. The chat bot directs the communication to the multiplatform management system 150. The multiplatform management system 150 uses the cloud elastic compute platform 154 to determine an event type associated with the communication. The determined event type is used to select which cloud platform to leverage to perform a particular task. If, as in this example, the communication includes an image indicative of a receipt, the multiplatform management system 150 generates a communication consistent with protocols of the image analysis platform 106. The generated communication is transmitted to the image analysis platform 106 to cause the image analysis platform 106 to respond with an image label (e.g., receipt) and image text (e.g., salad $10 tax $1 total $11).

The cloud elastic compute platform 154 of the multiplatform management system 150 analyzes the response from the image analysis platform 106 to generate a message for the HCM platform 104. The generated message can, for example, query information regarding a reimbursement entitlement associated with the user of the groupware platform 102. Upon receiving a response from the HCM platform 104 indicating that the user is entitled to the requested reimbursement, the multiplatform management system 150 generates and transmits a communication requesting to reimburse the user for the amount indicated on the receipt to cause the HCM platform 104 to initiate an electronic payment to the user.

Although only a holiday request and receipt reimbursement are explicitly described, various other examples for utilizing multiplatform management system 150 within an enterprise environment are contemplated. Nonlimiting examples for utilizing multiplatform management system 150 within an enterprise environment include a business travel request, a business travel reimbursement, holiday request change, reimbursement correction request, sales and/or client information request, or any combination thereof.

Figure 1B:
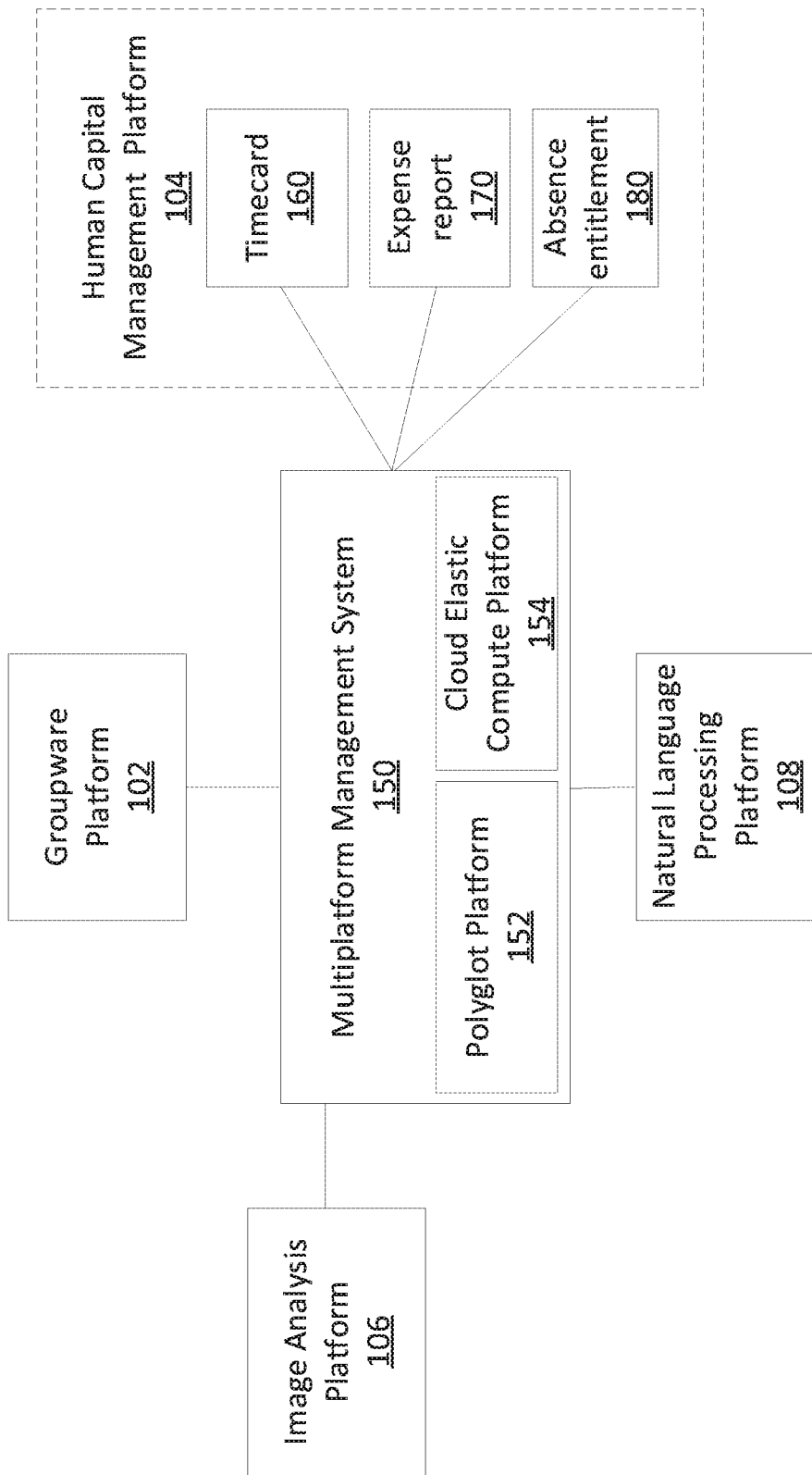
FIG. 1B illustrates a multiplatform management system 150 architecture, according to one embodiment.

FIG. 1B illustrates a multiplatform management system 150 architecture, according to one embodiment. The multiplatform management system 150 can improve user interface for electronic devices because the user does not have to switch between the multiple platforms such as 102, 106, 108, 160, 170, 180. Instead, the user can interact with the multiple platforms 102, 106, 108, 160, 170, 180 through a single interface, such as the groupware platform 102. Multiple platforms such as 102, 106, 160, 170, 180, which do not have a natural language user interface, can be enabled to interact with the user through a natural language interface when the multiplatform management system 150 interfaces between the natural language processing platform 108 and the remainder of the platforms 102, 106, 160, 170, 180. This type of natural language interface can be beneficial for devices with small screens because the user does not have to interact with a device through a set of barely visible menus but can interact with the electronic device through a natural language interface.

Figure 4A:
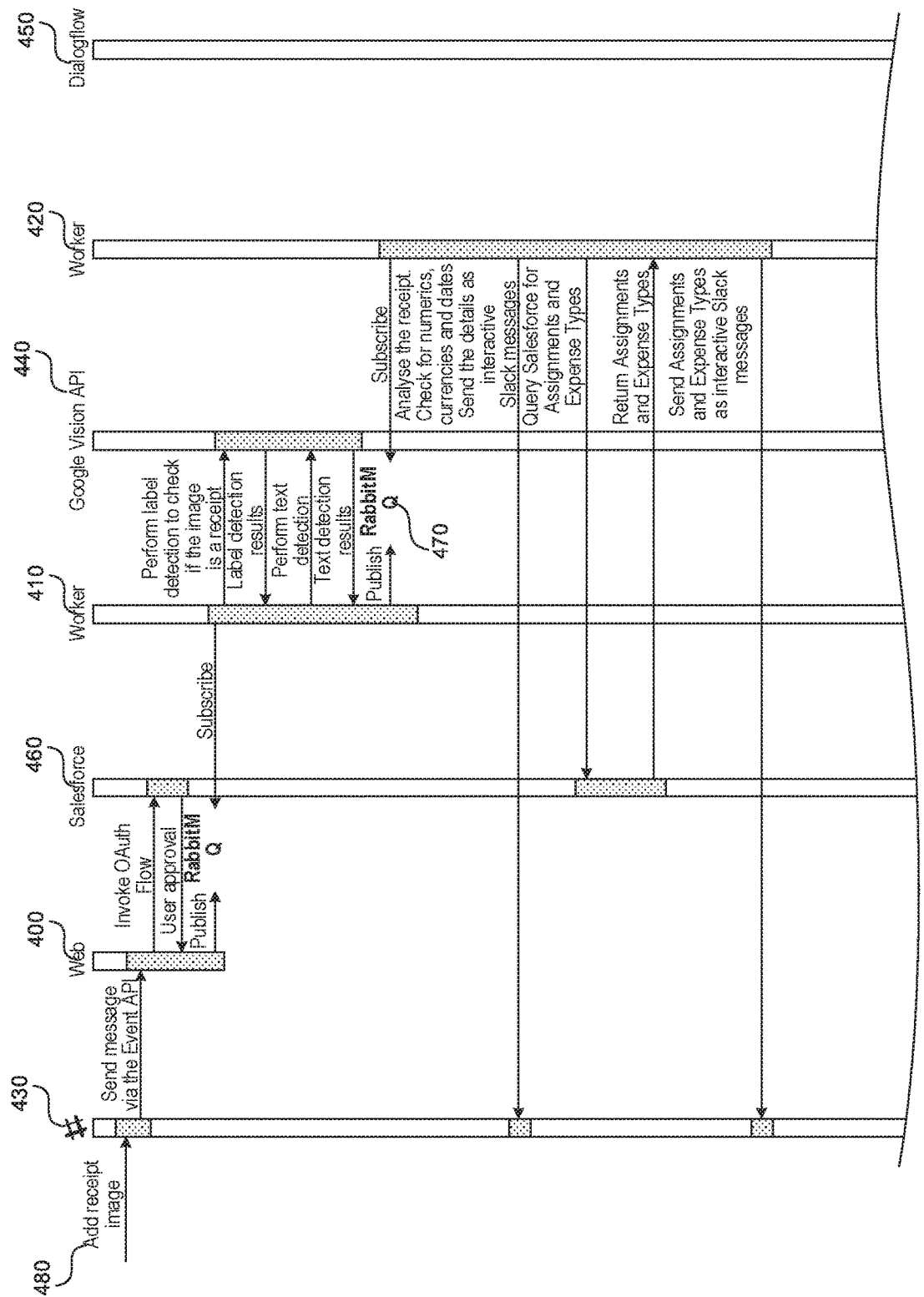
FIGS. 4A-4B illustrate an interaction between a user, a multiplatform management system, and multiple platforms, according to one embodiment.
Figure 4B:
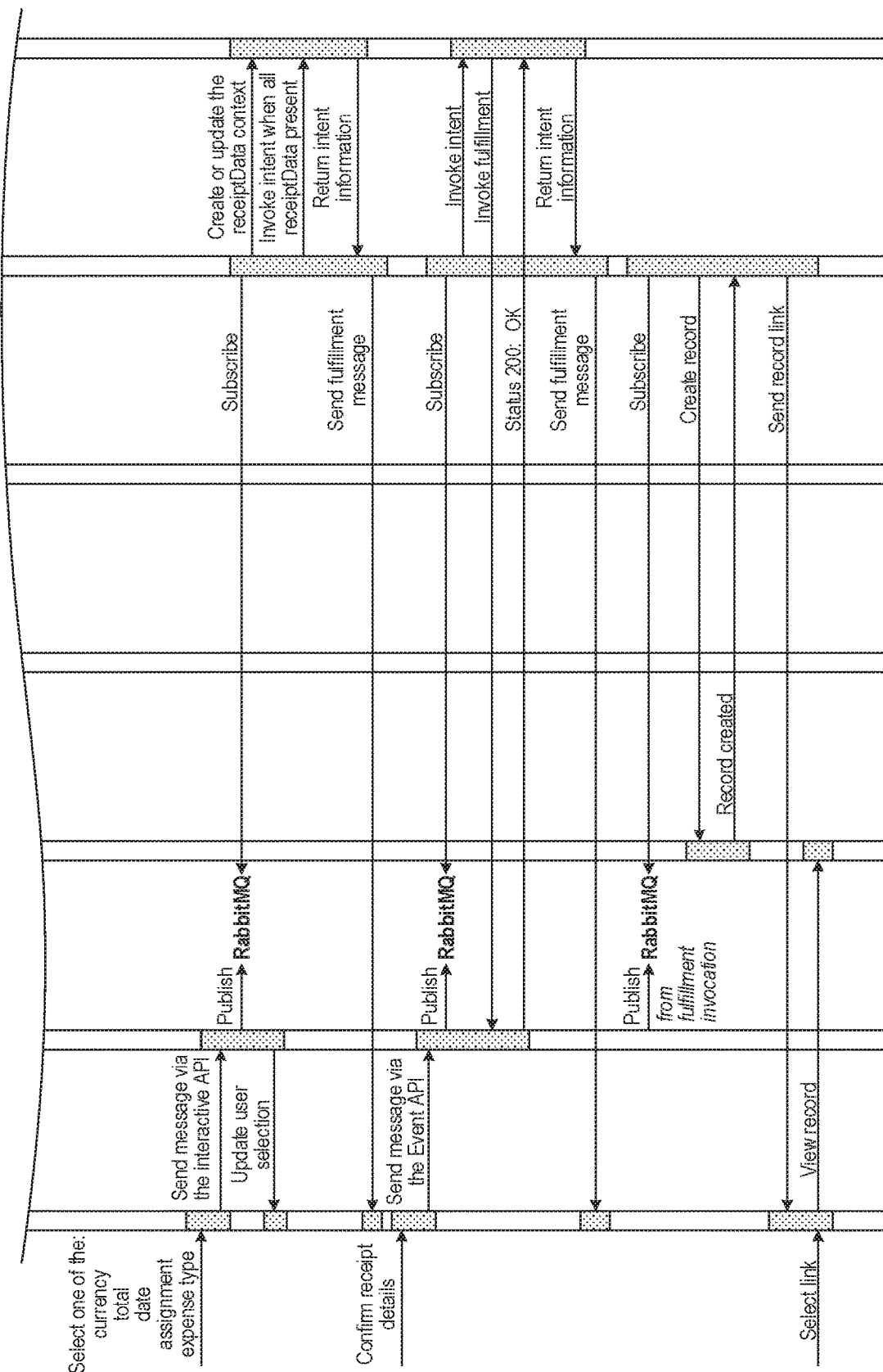
Figure 4C:
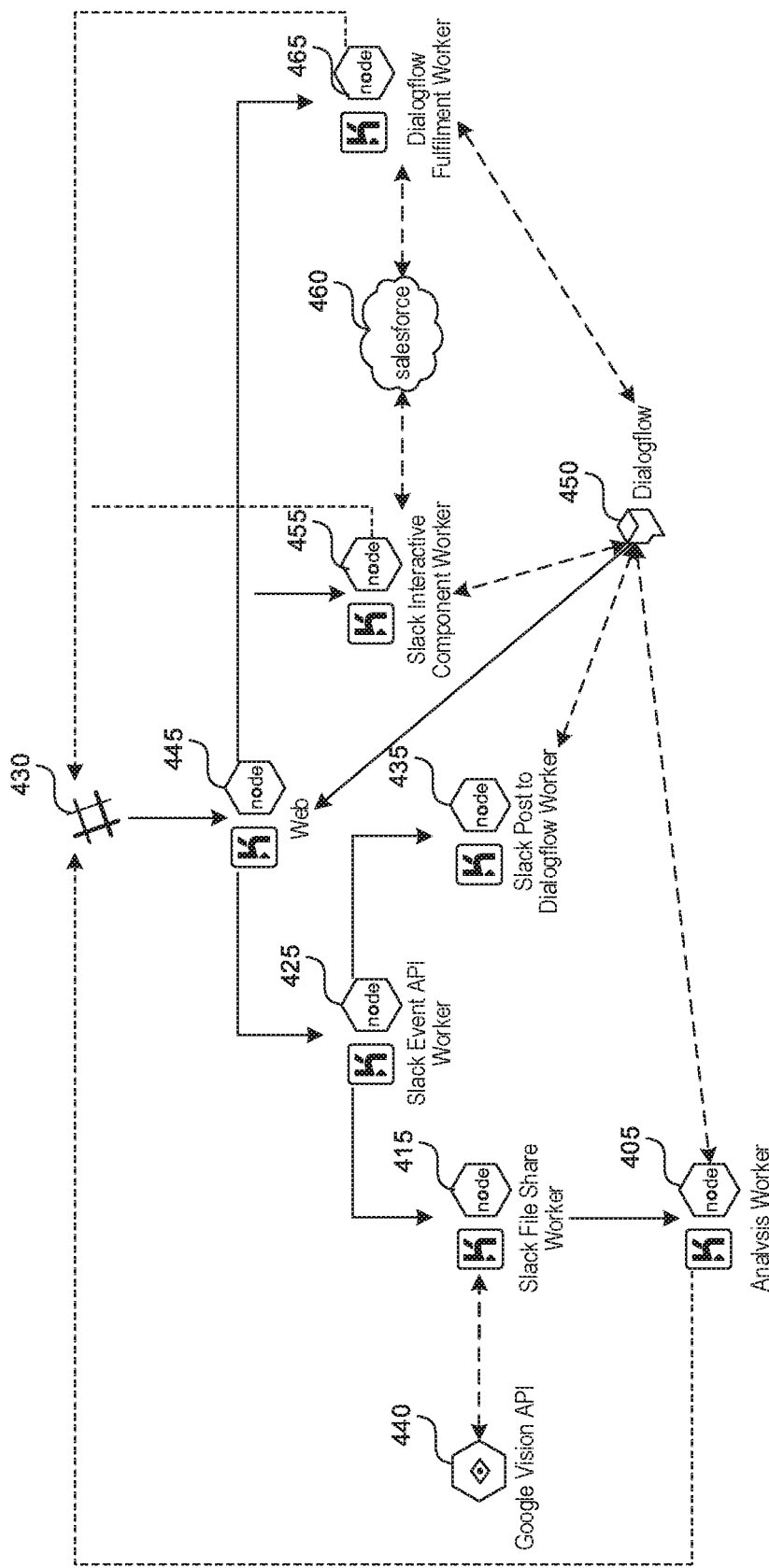
FIG. 4C illustrate an interaction between a user, a multiplatform management system, and multiple platforms, according to another embodiment.

The disclosed invention improves the efficiency of using the electronic device by bringing together a limited list of platforms 102, 104, 106, 108, 160, 170, 180 and commonly accessed stored data, which can be accessed directly from the single user interface using natural language inputs, such as a Slack platform 430 in FIGS. 4A-4C. Performing the necessary functions allows the user to see the most relevant data or functions without actually opening up the platforms 102, 104, 106, 108, 160, 170, 180. The speed of a user's navigation through various views and windows can be improved because it saves the user from navigating to the required platform, opening it up, and then navigating within that application to enable the data of interest to be seen or a function of interest to be activated. Rather than paging through multiple screens of options, only interaction with a single interface using natural language inputs may be needed from starting up to performing the desired functionality.

The system includes a groupware platform 102, a human capital management platform 104, an image analysis platform 106, a natural language processing platform 108, and the multiplatform management system 150. The multiplatform management system 150 manages the disparate platforms such as groupware platform 102, human capital management platform 104, the image analysis platform 106, the natural language processing platform 108. The disparate platforms 102, 104, 106, 108 may not be able to communicate with each other due to incompatible communication protocols and incompatible interfaces. The disparate platforms 102, 104, 106, 108 can be executed on various cloud computers. Multiplatform management system 150 can also be executed in a cloud computer or can be executed on a local computer.

The groupware platform 102 can receive a natural language request from a user and can forward the natural language request to a multiplatform management system. The natural language request can be in any of the human languages such as English, Spanish, Chinese, etc. The groupware platform 102 can include a user interface receiving a text or a spoken language. For example, the groupware platform can be a chat room, a Slack channel, an instant messaging application, etc. There can be multiple users in the groupware platform, talking to each other, as in a chat room setting. The groupware platform 102 can monitor the user inputs from the multiple users and can determine whether the user input is directed to the groupware platform. Upon determining that the user input is directed to the groupware platform 102, the groupware platform 102 can forward the user input to the multiplatform management system.

The multiplatform management system 150 can interface with one or more platforms 102, 104, 106, 108 and can obtain multiple actions. For example, the platform 102 can perform action such as receive user input, and present an output to show to the user, such as a response in the chat room, or a spoken response. The platform 104 can perform action such as by information regarding projects associated with a person in a workplace, holiday entitlement, can enable time entry, etc. The platform 106 can perform an action such as to analyze the received image and produce textual output. The platform 108 can perform an action such as to receive a textual or an audio input of a natural language, process the received natural language input and identify a user requested action within the input. The multiplatform management system 150 can receive the natural language request from the groupware platform 102 and can forward the natural language request to the natural language processing platform 108.

The natural language processing platform 108 can receive the natural language request and can identify a user requested action associated with the natural language request. For example, if the natural language request specifies "how much vacation time do I have?", the natural language processing platform 108 can identify "find vacation time" or "vacation time" as the user requested action. The user requested action can include words different from the natural language request. The natural language processing platform 108 can forward the identified user requested action to the multiplatform management system 150.

The multiplatform management system 150 can determine an action among multiple actions matching the user requested action better than a remainder of the multiple actions. For example, the user requested action can be identified as "vacation time" and the multiple actions can be "retrieve vacation time," "create expense report," "create time entry," "request vacation time," "retrieve expense report," etc. Multiplatform management system 150 can select "retrieve vacation time," and "request vacation time," as the two actions matching the user requested action "vacation time" better than the remainder of the multiple actions. If neither of the actions "request vacation time" or "retrieve vacation time" has a confidence threshold above a predetermined confidence threshold, the multiplatform management system 150 can ask the user to select one of the two actions, as described in this application. The predetermined confidence threshold can be 50%.

The multiplatform management system 150 can interface with multiple disparate platforms 102, 104, 106, 108, 160, 170, 180 by determining a platform among the multiple disparate platforms 102, 104, 106, 108, 160, 170, 180 that can perform the user requested action. The multiplatform management system 150 can format the user requested action into a format accepted by the platform 102, 104, 106, 108, 160, 170, 180 and can send the formatted user requested action to the platform 102, 104, 106, 108, 160, 170, 180.

The human capital management platform 104 can perform the action. For example, if "request vacation time" has a confidence level above the predetermined confidence threshold of 50%, the human capital management platform 104 can send the request for vacation time in the user's name. If neither of the actions "request vacation time" or "retrieve vacation time" has a confidence threshold above the predetermined confidence threshold, or neither of the actions is significantly more likely than the other, for example 15% more likely, the multiplatform management system 150 can ask the user to select one of the actions. Upon receiving the user selection, the multiplatform management system 150 can send the selection to the human capital management platform 104 to perform the action.

The multiplatform management system 150 can send a message to the groupware platform 102 informing the user that the action has been completed. For example, the message can be "vacation time from June 20-June 27 has been requested." The groupware platform 102 can present the message to the user using text or spoken language.

The groupware platform 102 can receive a natural language response from the user and can forward the natural language response to the multiplatform management system. The natural language response can include a feedback from the user regarding the performed action.

The feedback can be negative or positive. To determine whether the feedback is negative or positive, the multiplatform management system 150 can forward the feedback to the natural language processing platform 108 to analyze the feedback. An example of the negative feedback can be when the user says "That is not correct. The vacation time should be from June 12 to June 17." An example of a positive feedback can be "great, thank you." Another example of a positive feedback can be that the user does not respond to the informative message, and/or the user changes the topic. When the feedback is positive, the multiplatform management system 150 can send a reinforcing message to the natural language processing platform 108. When the feedback is negative, the multiplatform management system 150 can send a discouraging message to the natural language processing platform 108. The reinforcing message and the discouraging message can strengthen or weaken the processes used to determine the user requested action based on the natural language request.

The human capital management platform 104 can also include multiple disparate platforms 160, 170, 180 managing information regarding a workplace. For example, disparate platforms can include a platform 160 having a database to enter time worked, such as Intapp and/or Salesforce Data Cloud, a platform 170 having a database to track expense reports such as Chrome River, a platform 180 having a database to track absence entitlements, such as Salesforce Community Cloud, etc. Various user requested actions can be sent to various platforms 160, 170, 180. For example, "create expense report" can be sent to the platform 170 to create an expense report.

The cloud elastic compute platform 154 can receive a communication in a first programming language, can determine a type of the communication, and based on the type of the communication can determine a second platform to which to send a communication. The polyglot platform 152 can receive the communication and the type from the cloud elastic compute platform 154. The communication can be in the first programming language. The polyglot platform 152 can translate the communication from the first programming language associated with a first platform to a second programming language associated with a second platform and can send the translated communication to the second platform.

For example, the type of communication can be a text, in which case the cloud elastic compute platform 154 can send a message to the polyglot platform 152 that the type of communication is text and that the second platform is natural language processing platform 108. Another example, the type of communication can be an image or a video, in which case the cloud elastic compute platform 154 can send the message to the polyglot platform 152 that the type of communication is an image or video and that the second platform is image analysis platform 106. The polyglot platform 152 can translate the text, or the image to a message in the second format associated with the second platform and can send the message in the second format to the natural language processing platform 108, or the image analysis platform 106, respectively.

In another example, upon processing the communication through the image analysis platform 106 and/or the natural language processing platform, the cloud elastic compute platform can determine that a sub-type of the communication is an expense report. The cloud elastic compute platform 154 can determine that the correct module to send the communication is the platform 170 tracking expense reports.

FIG. 2 illustrates an example method performed using the multiplatform management system. In FIG. 2, an image is received by the multiplatform management system. The method can include, for example, providing a multiplatform management system configured to manage communications among multiple platforms (step 202), receiving an image via an event API of the multiplatform management system from a groupware platform (step 204), providing the image to an image processing platform to cause the imaging platform to return a label and image text (step 206), querying a human capital management (HCM) platform with the label and image text to cause the HCM platform to return an event associated with the label and image text (step 208), and providing the associated event to the groupware platform to cause the groupware platform to generate a message indicative of the associated event for an interactive chat (step 210).

Step 202 comprises providing a multiplatform management system configured to manage communications among multiple platforms. The communications are configured to cause the multiple platforms to perform a platform-specific function. For example, the communications can cause an image processing platform to parse an image for objects and/or text and return an image label and/or image text.

Step 204 comprises receiving an image via an event API of the multiplatform management system from a groupware platform. The groupware platform can include a chat bot configured to forward certain communications to the multiplatform management system. Upon receiving a user input including an image, the chat bot sends the image to the multiplatform management system for further processing, encoding, and selective forwarding to one or more other cloud computing platforms. In a non-limiting example, the image can include an itemized list of one or more purchased items (e.g., a receipt).

Step 206 comprises providing the image to an image processing platform to cause the image processing platform to return an image label and image text. The image provided to the image processing platform conforms with protocols of the image processing platform. The image conforms because the multiplatform management system knows or predicts protocols of the image processing platform and encodes the image accordingly.

Step 208 comprises querying an HCM platform with the label and image text to cause the HCM platform to return an event associated with the label and image text. The cloud elastic compute platform of the multiplatform management system analyzes the response from the image analysis platform to generate a message for the HCM platform. The generated message can, for example, query information regarding a reimbursement entitlement associated with the user of the groupware platform. Upon receiving a response from the HCM platform indicating that the user is entitled to the requested reimbursement, the multiplatform management system generates and transmits a communication requesting to reimburse the user for the amount indicated on the receipt to cause the HCM platform to initiate an electronic payment to the user.

Step 210 comprises providing the associated event to the groupware platform to cause the groupware platform to generate a message indicative of the associated event for an interactive chat. For example, the generated message can indicate that an associated event (e.g., a reimbursement request) was successfully initiated, the associated event is not authorized for the user (e.g., purchased item not reimbursable for the user), or the associated event is altered (e.g., user reimbursed for a different amount).

FIG. 3 illustrates another example method performed using the multiplatform management system. In FIG. 3, text is received by the multiplatform management system. The method can include, for example, providing a multiplatform management system configured to manage communications among multiple platforms (step 302), receiving a communication comprising text via an event API of the multiplatform management system from a groupware platform (step 304), providing the text to a natural language processing (NLP) platform to cause the NLP platform to return a parsed data structure indicative of a meaning of the text, the provided text conforming with protocols of the NLP platform (step 306), querying an HCM platform with the text meaning to cause the HCM platform to return an event associated with the text meaning (step 308), and providing the associated event to the groupware platform to cause the groupware platform to generate a message indicative of the associated event for an interactive chat (step 310).

Step 302 comprises providing a multiplatform management system configured to manage communications among multiple platforms. The communications are configured to cause the multiple platforms to perform a platform-specific function. For example, the communications can cause an NLP platform to parse an text for context and/or meaning and return a parsed data structure.

Step 304 comprises receiving a communication comprising text via an event API of the multiplatform management system from a groupware platform. The groupware platform can include a chat bot configured to forward certain communications to the multiplatform management system. Upon receiving a user input including text (e.g., text with a trigger word or phrase), the chat bot sends the text to the multiplatform management system for further processing, encoding, and selective forwarding to one or more other cloud computing platforms.

Step 306 comprises providing the text to a natural language processing (NLP) platform to cause the NLP platform to return a parsed data structure indicative of a meaning of the text. The provided text conforming with protocols of the NLP platform.

In another example, a user of the groupware platform 102 can send a message including an image. The chat bot directs the communication to the multiplatform management system 150. The multiplatform management system 150 uses the cloud elastic compute platform 154 to determine an event type associated with the communication. The determined event type is used to select which cloud platform to leverage to perform a particular task. If, as in this example, the communication includes an image indicative of a receipt, the multiplatform management system 150 generates a communication consistent with protocols of the image analysis platform 106. The generated communication is transmitted to the image analysis platform 106 to cause the image analysis platform 106 to respond with an image label (e.g., receipt) and image text (e.g., salad $10 tax $1 total $11).

Step 308 comprises querying an HCM platform with the text meaning to cause the HCM platform to return an event associated with the text meaning. In an embodiment, a cloud elastic compute platform of the multiplatform management system analyzes the response from the NLP platform to generate a message for the HCM platform. The generated message can, for example, query information regarding a holiday entitlement associated with the user of the groupware platform. Upon receiving a response from the HCM platform indicating that the user is entitled to the requested holiday, the multiplatform management system generates and transmits a communication requesting to reserve a holiday for the user for the requested dates to cause the HCM platform to update an employee holiday database.

Step 310 comprises providing the associated event to the groupware platform to cause the groupware platform to generate a message indicative of the associated event for an interactive chat. For example, the generated message can indicate that an associated event (e.g., a holiday request) was successfully scheduled for the requested time, the associated event is not authorized for the user (e.g., exceeds holiday time allocated for the user), or the associated event is altered (e.g., holiday scheduled for a different time).

FIGS. 4A-4B illustrate an interaction between a user, a multiplatform management system, and multiple platforms, according to one embodiment. The various platforms 400, 410, 420 within the multiplatform management system 150 can use messaging applications such as RabbitMQ 470 (only one labeled for brevity) to communicate with each other. Slack platform 430 can be the groupware platform 102 in FIGS. 1A-1B. The Google Vision API platform 440 can be the image analysis platform 106 in FIGS. 1A-1B. The Dialogflow platform 450 can be the natural language processing platform 108 in FIGS. 1A-1B. The Salesforce platform 460 can be the human capital management platform 104. The human capital management platform 104 in FIGS. 1A-1B can contain multiple Salesforce platforms, or other modules such as Workday, Intapp, Chrome River, etc.

In step 480, the user can submit a receipt image to the Slack platform 430. FIGS. 4A-4B show the multiplatform management system 150 interfaces with the various platforms 400, 410, 420, 430, 440, 450, 460 and the user to create the record within the Salesforce platform 460 representing the expense report.

FIG. 4C illustrates an interaction between a user, a multiplatform management system, and multiple platforms, according to another embodiment. The modules 405, 415, 425, 435, 445, 455, 465 can be part of a multiplatform management system 150 in FIGS. 1A-1B. The multiplatform management system can facilitate communication between various disparate platforms such as Slack platform 430, Google Vision API platform 440, Dialogflow platform 450, Salesforce platform 460, etc.

Multiplatform management system 150 can receive a communication from the various disparate platforms 430, 440, 450, 460, determine a target platform to send a communication to, format the communication to form an acceptable to the target platform, and send the communication to the target platform. For example, module 445 can communicate between platform 430 and platform 450, while module 465 can communicate between platform 430, platform 450, and platform 460.

In another example, module 425 can be a whole or a part of the cloud elastic compute platform 154 in FIGS. 1A-1B. The module 425 can determine the type of input received from module 445 and based on whether the type of input received is text or image, the module 425 can send the input received to module 415, or module 435. Module 415 and 435 can be part of the polyglot platform 152 in FIGS. 1A-1B.

Figure 5:
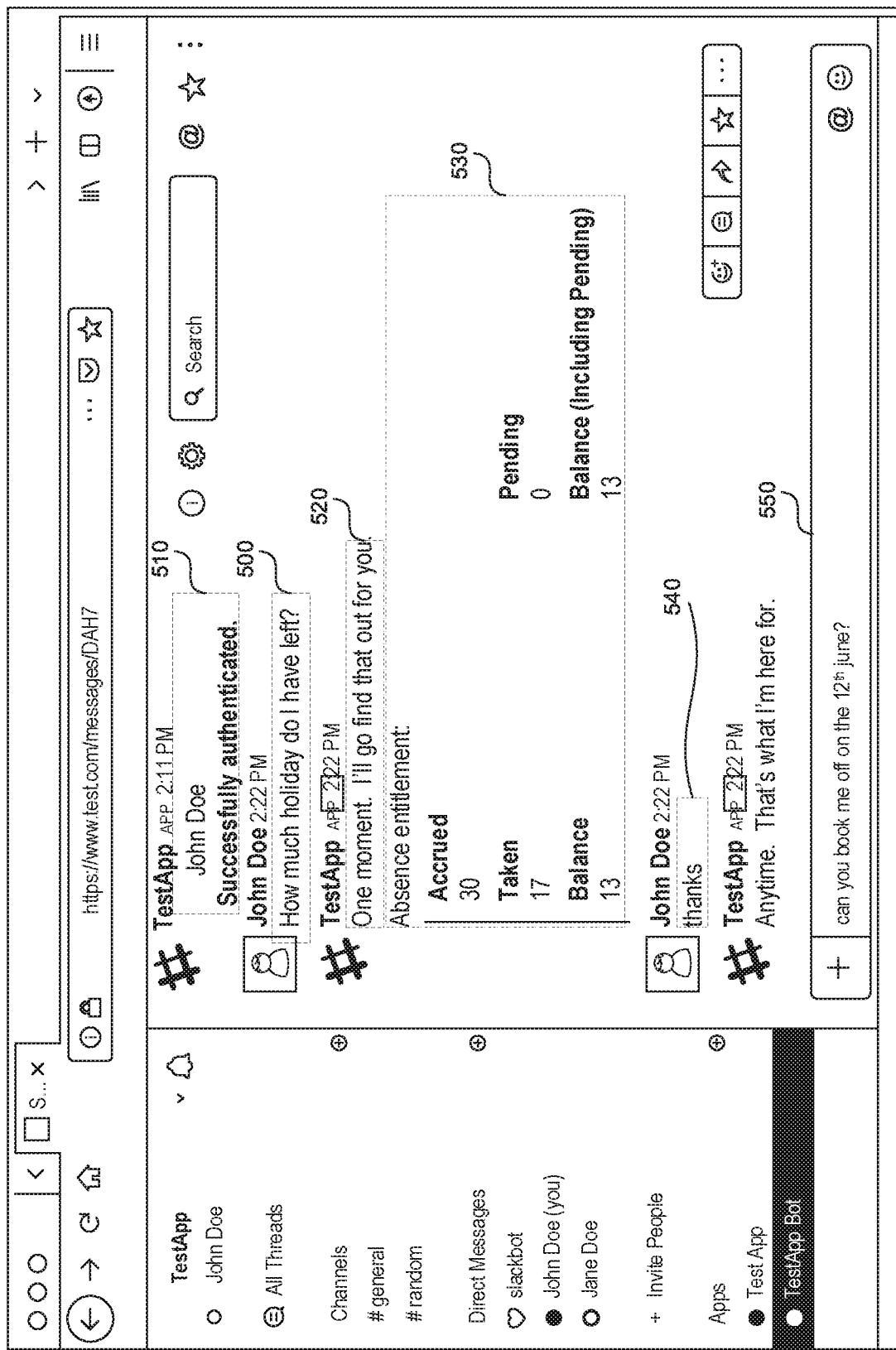
FIG. 5 illustrates a natural language interaction between the user and a multiplatform management system.

FIG. 5 illustrates a natural language interaction between the user and multiplatform management system. The user provides a natural language request 500 "how much holiday do I have left?" to the groupware platform 102 in FIGS. 1A-1B. The cloud elastic compute platform 154 in FIGS. 1A-1B, can determine that the natural language request 500 should be sent to the natural language processing platform 108 in FIGS. 1A-1B, and can send the natural language request 500 and the target platform, i.e., the natural language processing platform 108 to the polyglot platform 152 in FIGS. 1A-1B.

The polyglot platform 152 can translate the natural language request 500 into a format acceptable to the natural language processing platform 108 and can send the natural language request 500 to the natural language processing platform 108.

The natural language processing platform 108 can interpret the natural language request based on the natural language input 510 entered prior to the natural language request 500. For example: "I" in the natural language request 500 is interpreted based on who the authenticated person is in the natural language input 510. For example, if the person logged in is authenticated as John Doe, the natural language processing platform 108 can interpret the natural language request 500 as the user requested action "determine absence entitlement for John Doe."

The cloud elastic compute platform 154 in FIGS. 1A-1B can receive the user requested action, "determine absence entitlement for John Doe," and determine that the proper platform to handle the user requested action is the absence entitlement platform 180 in FIG. 1B. Cloud elastic compute platform 154 can pass the user requested action "determine absence entitlement for John Doe" and the identification (ID) of the platform 182 to the polyglot platform 152. The polyglot platform 152 can translate the user requested action into a format that the platform 180 can understand and send the properly formatted user requests to the platform 180. The platform 180 can retrieve the information regarding absence entitlements and provide to the polyglot platform 152. The polyglot platform 152 can provide the received response to the groupware platform 102.

The groupware platform 102 can provide a message 520 to the user while the user request is being executed in the background. Upon receiving the response from the polyglot platform 152, the groupware platform 102 can provide a response 530 to the user including information regarding absence entitlements for John Doe.

The user response 540 is a natural language response from the user that can contain a feedback regarding the performed action. The user response 540 can contain positive or negative feedback. When the natural language response includes a positive feedback, the polyglot platform 152 can send a reinforcing feedback to the natural language processing platform 108. The natural language processing platform 108 can use the reinforcing feedback to increase the weights of processing components, e.g., neurons, used in identifying the user requested action. When the natural language response includes a negative feedback, the polyglot platform 152 can send a discouraging feedback to the natural language processing platform 108. The natural language processing platform 108 can use the reinforcing feedback to decrease the weights of processing components, e.g., neurons, used in identifying the user requested action. The user response 540 includes positive feedback, and consequently, the natural language processing platform 108 can increase the weights of processing components used in identifying the user requested action.

The user request 550 is interpreted in the context of the user's prior statements. Consequently, when the user requests a vacation on 12 June, the multiplatform management system 150 can perform the request, without asking the user for the year.

Figure 6:
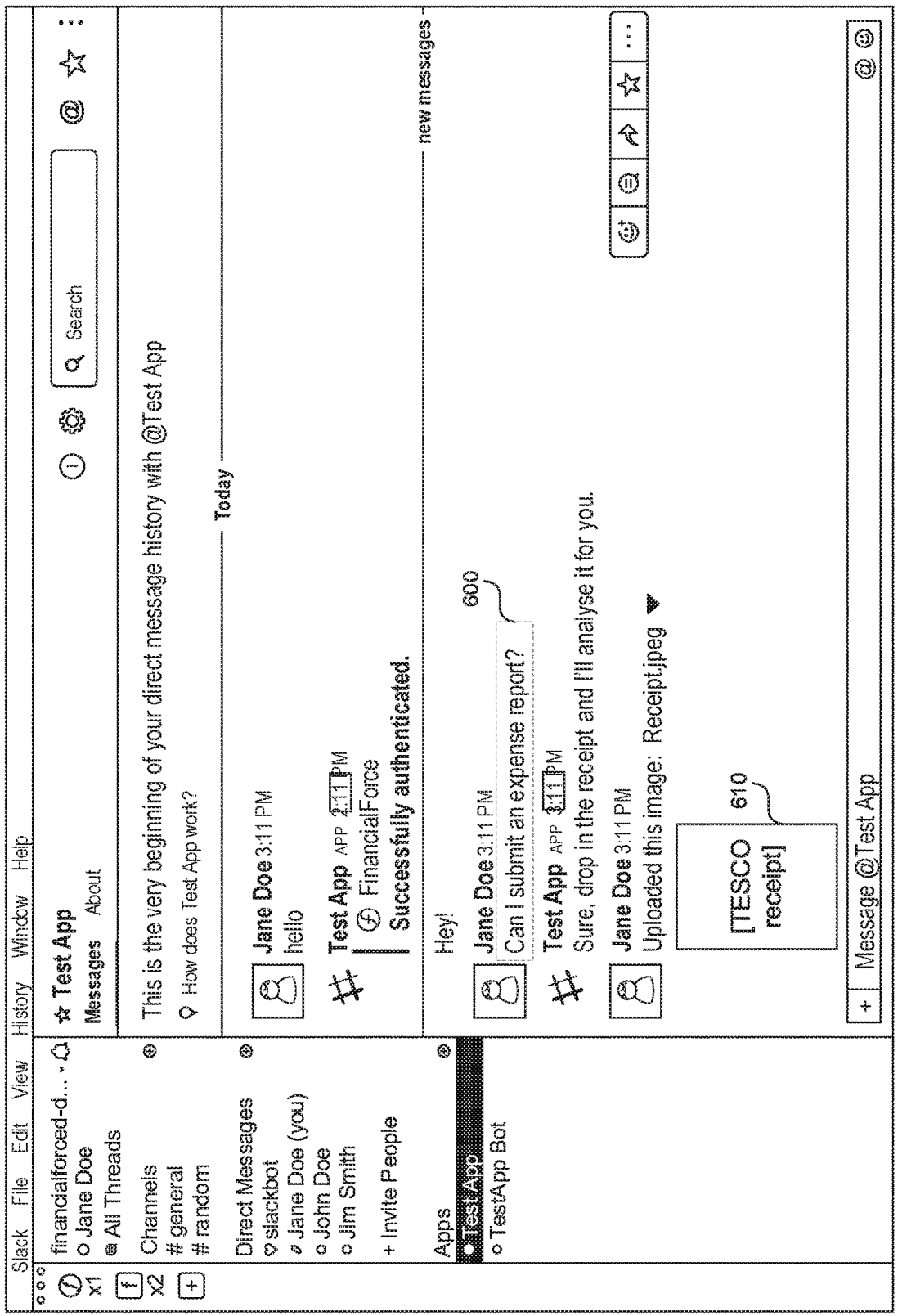
FIG. 6 illustrates a natural language interaction, including an image, between the user and a multiplatform management system.

FIG. 6 illustrates a natural language interaction, including an image, between the user and a multiplatform management system. The user provides a natural language request 600 "can I submit an expense report?" to the groupware platform 102 in FIGS. 1A-1B. The cloud elastic compute platform 154 in FIGS. 1A-1B can determine that the natural language request 600 should be sent to the natural language processing platform 108 in FIGS. 1A-1B, and can send the natural language request 600 and the target platform, i.e., the natural language processing platform 108, to the polyglot platform 152 in FIGS. 1A-1B.

The polyglot platform 152 can translate the natural language request 600 into a format acceptable to the natural language processing platform 108 and can send the natural language request 600 to the natural language processing platform 108. Similar to FIG. 5, the natural language processing platform 108 can interpret the user request in the context of the prior statements and can associate "I" with "John Doe." The natural language processing platform 108 can determine that the user requested action is "submit expense report."

The cloud elastic compute platform 154 in FIGS. 1A-1B can receive the user requested action, "submit expense report," and determine that the proper platform to handle the user requested action is the expense report platform 170 in FIG. 1B.

Upon receiving the image 610, the cloud elastic compute platform 154 can determine that the proper platform to handle the expense report in the form of an image is the image analysis platform 106 in FIGS. 1A-1B. The cloud elastic compute platform 154 can pass the image and the target platform, i.e., the image analysis platform 106, to the polyglot platform 152. The polyglot platform 152 can transform the image into a format acceptable to the image analysis platform 106, and can formulate a request to analyze the image 610. Further, the polyglot platform can send the type of the image, such as receipts, to the image analysis platform 106. The polyglot platform 152 can send the image and the request to the image analysis platform 106.

Figure 7:
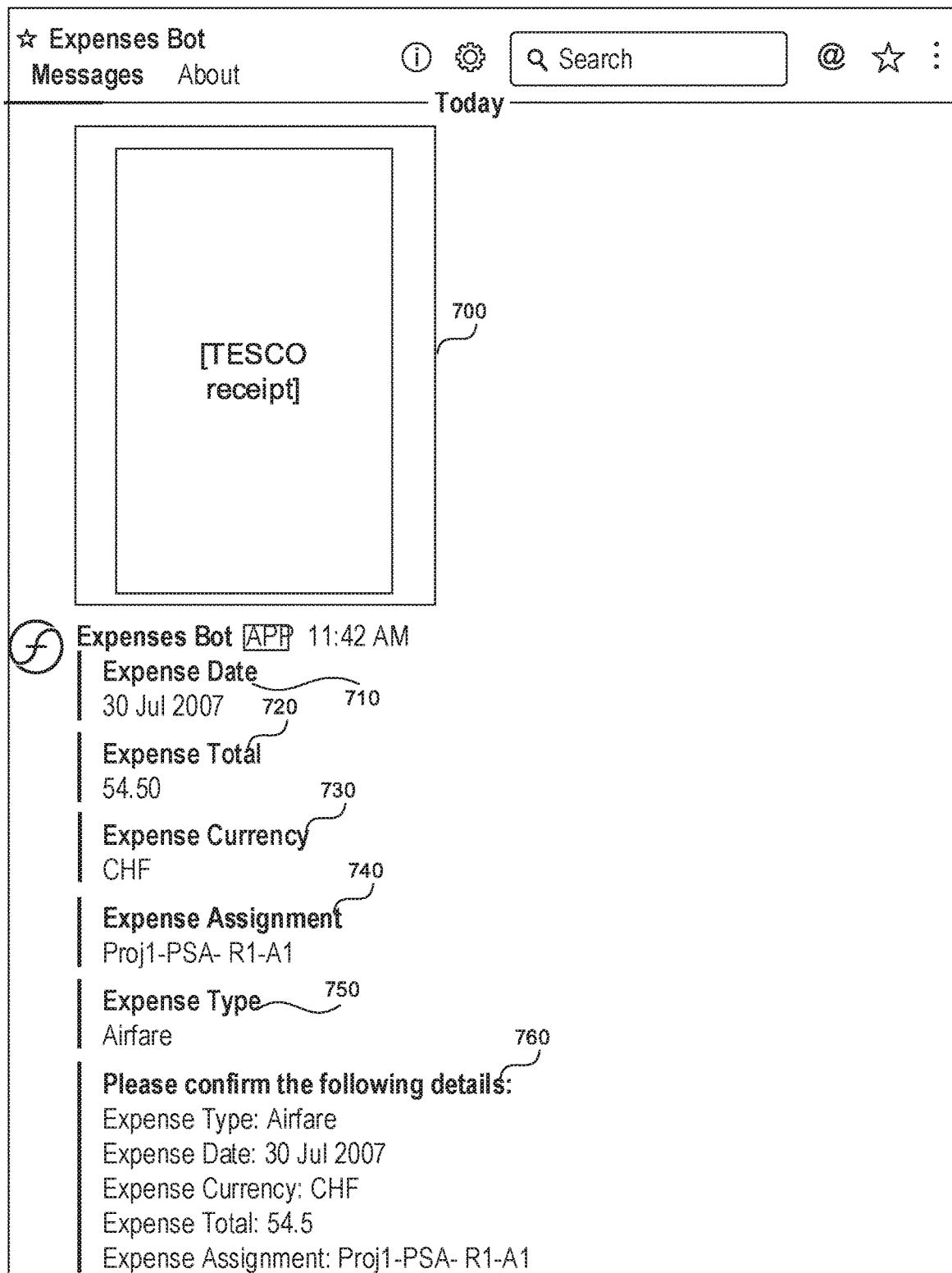
FIG. 7 shows a result of image analysis.

FIG. 7 shows a result of image analysis. The image analysis platform 106 in FIGS. 1A-1B can identify various relevant entries within the image 700. The image analysis platform 106 can determine the relevant entries based on the type of the image received, such as receipts. The type of image "receipt" can have as relevant entries "expense date" 710, "expense total" 720, "expense currency" 730, "expense assignment" 740, and/or "expense type" 750. The image analysis platform 106 can search the received image 700 to identify the relevant entries. The image analysis platform can provide the identified values for the relevant entries to the user, as shown in FIG. 7.

In one embodiment, the multiplatform management system 150 in FIGS. 1A-1B can query the user whether the presented information is correct, as shown in element 760. In another embodiment, the multiplatform management system 150 can query the user, if the confidence level provided by the image analysis platform 106 is below a predefined threshold. For example, if the confidence level for a relevant entry is below 90%, then the multiplatform management system 150 can ask the user for confirmation of the value of the relevant entry; otherwise, the multiplatform management system can assume that the identified value is correct.

Figure 8:
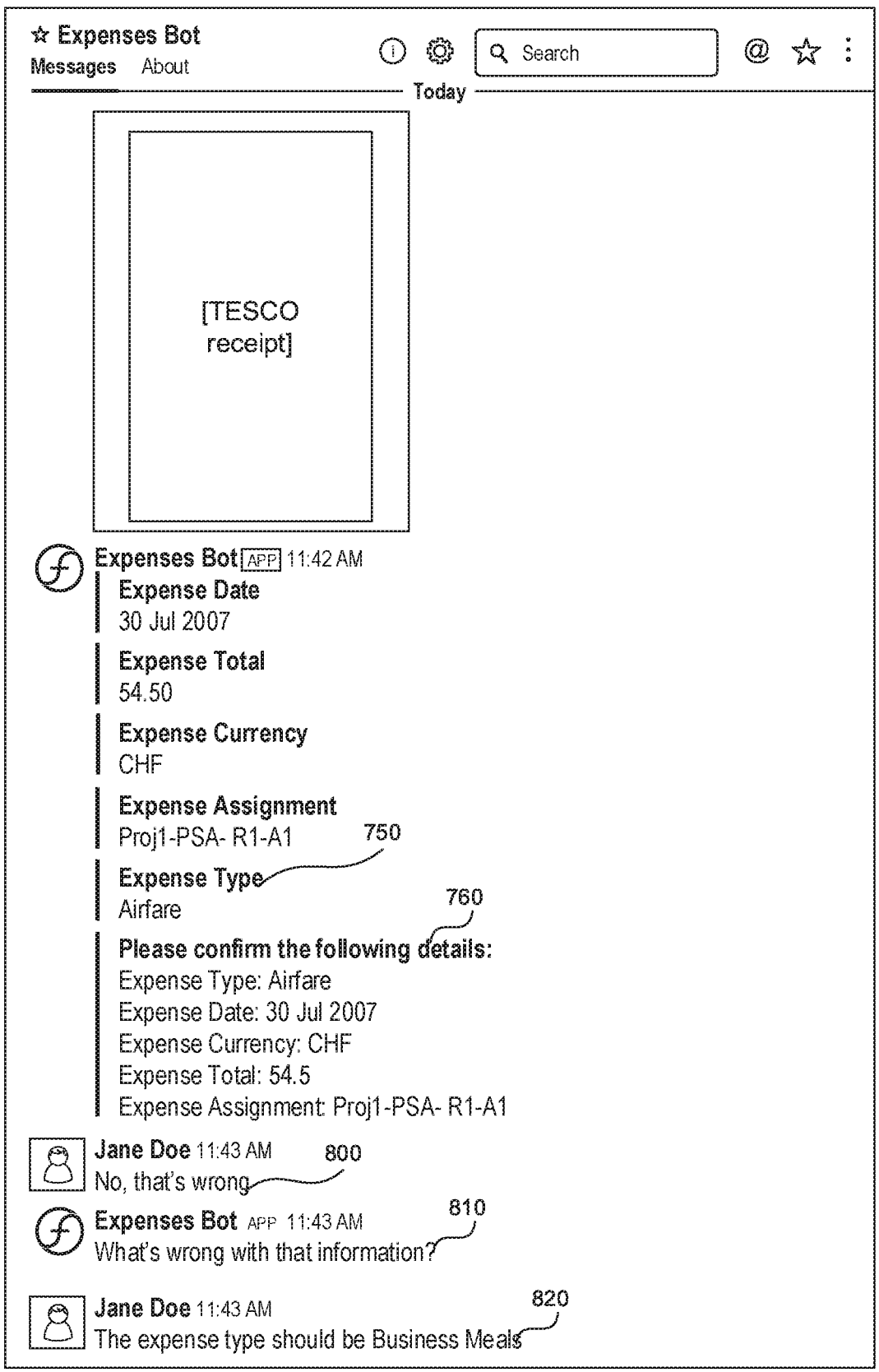
FIG. 8 shows a negative feedback provided by the user.

FIG. 8 shows a negative feedback provided by the user. In response to the query whether the presented information is correct, as shown in element 760, the user can provide a feedback 800. The feedback 800 can be positive or negative.

To analyze whether the feedback 800 is positive or negative, the groupware platform 102 can pass the received feedback 800 to the multiplatform management system 150 in FIGS. 1A-1B. The cloud elastic compute platform 154 in FIGS. 1A-1B can identify that the feedback 800 should be sent to the natural language processing platform 108, and communicate the feedback 800 and the target module, i.e., the natural language processing platform, to the polyglot platform 152 in FIGS. 1A-1B. As explained in this application, the polyglot platform 152 can convert the feedback 800 into a format accepted by the natural language processing platform 108 and can send the converted feedback 800 to the natural language processing platform 108.

The natural language processing platform 108, upon analyzing the feedback 800, can determine whether the feedback is positive or negative. In the present case, the feedback 800 is negative. The natural language processing platform 108 can formulate the question to present to the user, such as a question 810, to further disambiguate which part of the query 760 is incorrect. The natural language processing platform 108 can send the question 810 to the cloud elastic compute platform 154. The cloud elastic compute platform 154 can determine that the target module is the groupware platform 102 in FIGS. 1A-1B and send the target module to the polyglot platform 152 along with the question 810. The polyglot platform 152 can correctly format the question 810 and send it to the polyglot platform 152 to present to the user.

The received user response 820 can be sent to the natural language processing platform 108 to determine which part of the analyzed image 700 is incorrect. In this case, the incorrect part of the analyzed image is entry "expense type" 750.

The image analysis platform 106 as well as the natural language processing platform 108 can retain at least one previously analyzed image and natural language input, respectively, as well as a process used in analyzing the previously analyzed natural language inputs. The feedback 800 received from the user as well as the incurred part of the analyzed image can be sent to the appropriate module, such as the image analysis platform 106 and/or the natural language processing platform 108. The image analysis platform 106 and/or the natural language processing platform 108 can reinforce or discourage the processes used in producing the incorrect part based on whether the feedback is positive or negative, respectively.

Figure 9:
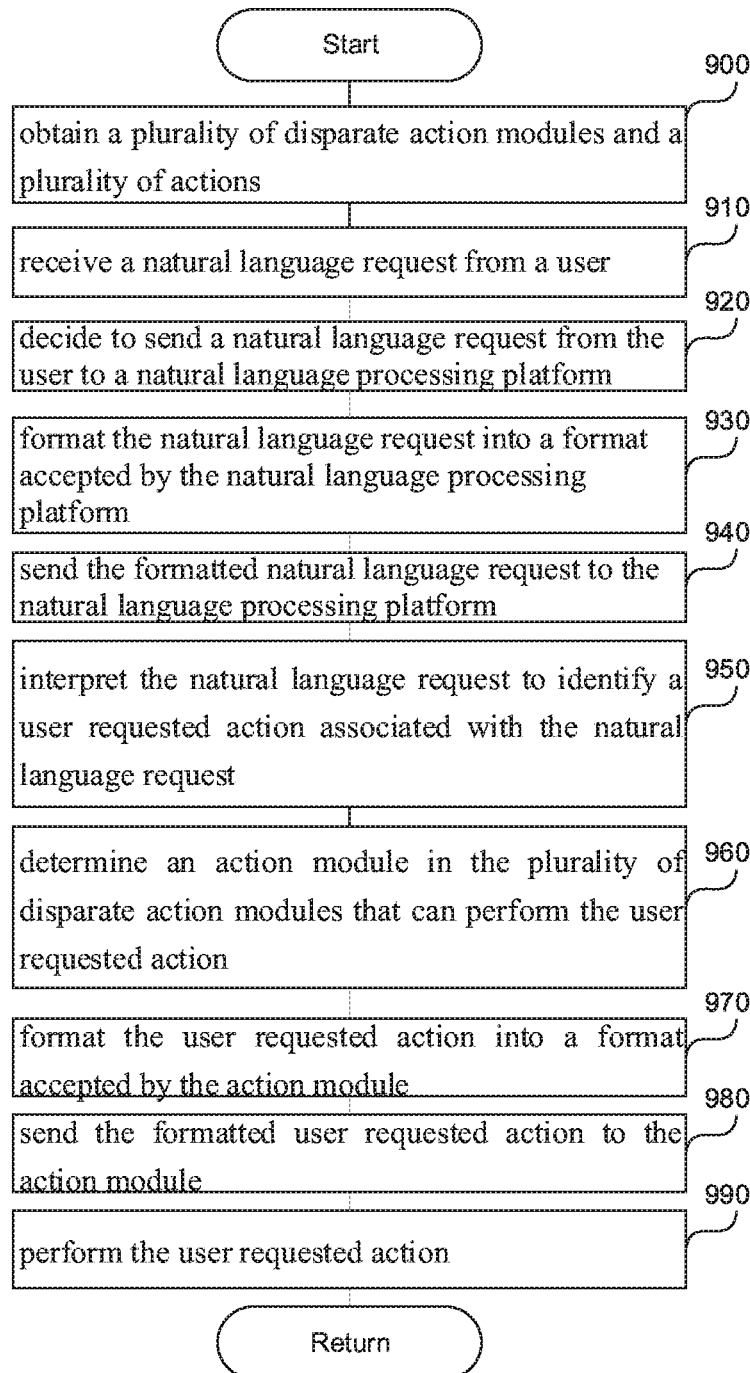
FIG. 9 is a flowchart of a method to interface between multiple disparate platforms, according to one embodiment.

FIG. 9 is a flowchart of a method to interface between multiple disparate platforms, according to one embodiment. In step 900, a processor can obtain multiple disparate platforms and multiple actions. Each action among the multiple actions can be performed by at least one platform among the multiple disparate platforms. In some embodiments, each action can be performed by only one platform among the multiple disparate platforms. A platform among the multiple platforms cannot communicate with a remainder of the multiple disparate platforms.

To perform the integration, a processor associated with a groupware platform 102 in FIGS. 1A-1B can, in step 910, receive a natural language request from a user. The natural language request can be in any human language such as English, Chinese, Spanish, etc. The groupware platform 102 can be a part of the multiple disparate platforms.

In step 920, based on the multiple actions and the multiple disparate platforms, the multiplatform management system 150 in FIGS. 1A-1B can decide to send a natural language request from the user to a natural language processing platform 108 in FIGS. 1A-1B. The groupware platform 102 and the natural language processing platform 108 are not configured to communicate to each other.

In step 930, the multiplatform management system 150 can format the natural language request into a format accepted by the natural language processing platform 108. In step 940, the multiplatform management system 150 can send the formatted natural language request to the natural language processing platform 108.

In step 950, a processor associated with the natural language processing platform 108 can interpret the natural language request to identify a user requested action associated with the natural language request. The user requested action can be "provide absence entitlement," "submit expense report," "enter timecard," etc. The natural language processing platform can be a dialogue tree, which can interpret the user requested action in the context of prior dialogue, as described in this application.

In step 960, based on the multiple actions and the multiple disparate platforms, the multiplatform management system 150 can determine the platform among the multiple disparate platforms 102, 104, 106, 108, 160, 170, 180 in FIG. 1B that can perform the user requested action. The platform, the groupware platform 102 and the natural language processing platform 108 are not configured to communicate to each other.

In step 970, the multiplatform management system 150 can format the user requested action into a format accepted by the platform. In step 980, the multiplatform management system 150 can send the formatted user requested action to the platform 102, 104, 106, 108, 160, 170, 180. In step 990, the platform 102, 104, 106, 108, 160, 170, 180 can perform the action.

The groupware platform 102 can receive a natural language response from the user in response to performing the action. The multiplatform management system 150 can provide feedback to the natural language processing platform 108. The feedback is reinforcing when the natural language response includes a positive feedback and the feedback is discouraging when the natural language response includes a negative feedback.

To determine the platform 102, 104, 106, 108, 160, 170, 180, the multiplatform management system 150 can find the platform 102, 104, 106, 108, 160, 170, 180 that upon performing the user requested action has received positive feedback more frequently than the remainder of the multiple disparate platforms 102, 104, 106, 108, 160, 170, 180.

Figure 10:
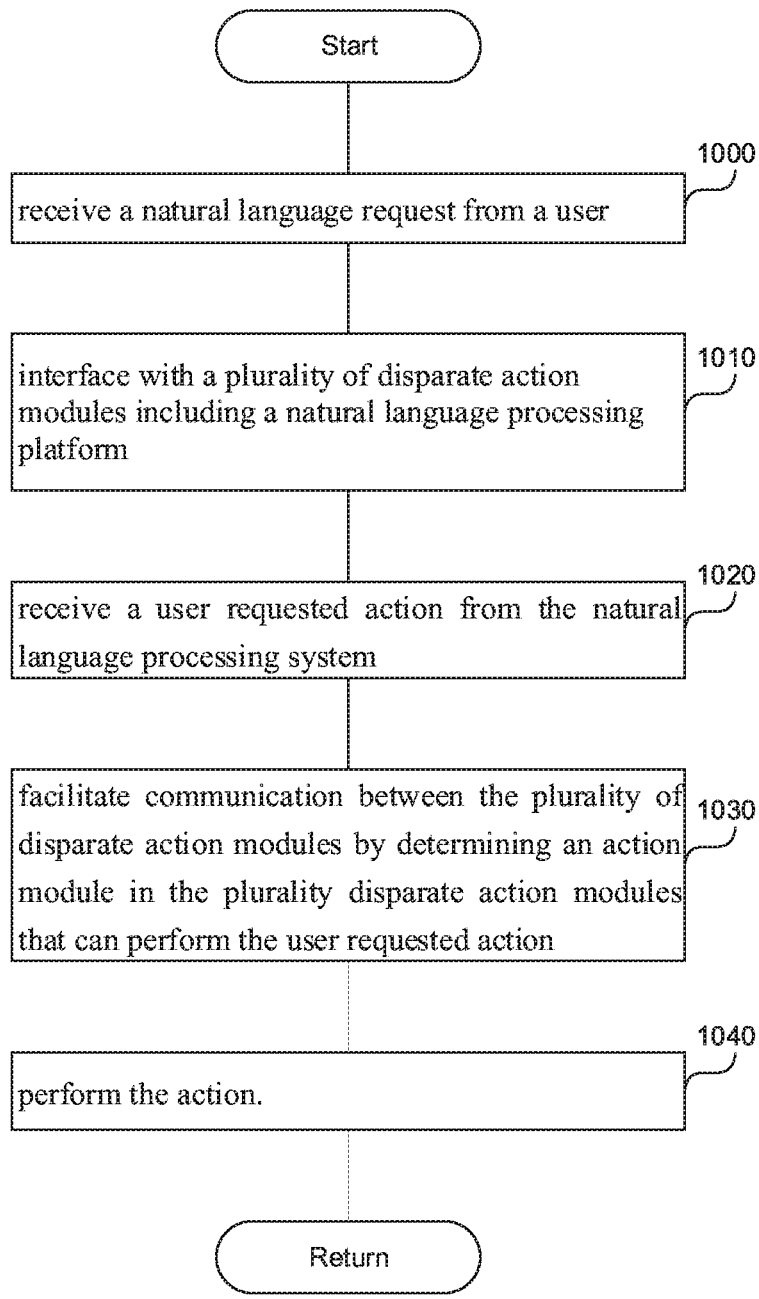
FIG. 10 is a flowchart of a method to interface between multiple disparate platforms, according to one embodiment.

FIG. 10 is a flowchart of a method to interface between multiple disparate platforms, according to one embodiment. The multiplatform management system 150 in FIGS. 1A-1B can improve user interface for electronic devices because the user does not have to switch between the multiple platforms such as 102, 106, 108, 160, 170, 180 FIG. 1B. Instead, the user can interact with the multiple platforms 102, 106, 108, 160, 170, 180 through a single interface, such as a Slack platform 430 in FIGS. 4A-4C. This type of interface can be beneficial for devices with small screens because the user does not have to switch between and manage multiple interfaces to multiple platforms 102, 104, 106, 108, 160, 170, 180.

The disclosed invention improves the efficiency of using the electronic device by bringing together a limited list of platforms 102, 104, 106, 108, 160, 170, 180 and commonly accessed stored data, which can be accessed directly from the single user interface, such as a Slack platform 430. Performing the necessary functions allows the user to see the most relevant data or functions without actually opening the platforms 102, 104, 106, 108, 160, 170, 180. The speed of a user's navigation through various views and windows can be improved because it saves the user from navigating to the required platform, opening it, and then navigating within that application to enable the data of interest to be seen or a function of interest to be activated. Rather than paging through multiple screens of options, interaction with only a single interface may be needed from start up to reaching the required data/functionality.

In step 1000, a processor associated with a multiplatform management system 150 in FIGS. 1A-1B can receive a natural language request from a user. The natural language request can be in a human language.

In step 1010, the multiplatform management system 150 can interface with multiple disparate platforms including a natural language processing platform. Each platform among the multiple disparate platforms can be configured to perform an action in multiple actions. To interface with the multiple disparate platforms, the multiplatform management system 150 can format the natural language request into a format accepted by the natural language processing platform and can forward the formatted natural language request to the natural language processing platform. The multiple disparate platforms can be any of platforms 102, 104, 106, 108, 160, 170, 180 in FIGS. 1A-1B; 430, 440, 450, 460 in FIGS. 4A-4C; etc.

For example, the multiplatform management system 150 can store a list of actions associated with each of the multiple disparate platforms 102, 104, 106, 108, 160, 170, 180 in FIGS. 1A-1B; 430, 440, 450, 460 in FIGS. 4A-4C; etc. To determine which of the multiple disparate platforms can perform the action, multiplatform management system 150 can match the user requested action to an action associated with one of the multiple disparate platforms. Upon determining which of the multiple disparate platforms can perform the action, the multiplatform management system 150 can format the request into a format acceptable by the selected platform.

In step 1020, the multiplatform management system 150 can receive a user requested action from the natural language processing system, such as "create expense report," "retrieve absence entitlements," "create a timecard entry," "retrieve active projects," etc.

In step 1030, the multiplatform management system 150 can facilitate communication between the multiple disparate platforms by determining a platform among the multiple disparate platforms that can perform the user requested action. The multiplatform management system 150 can format the user requested action into a format accepted by the platform and sending the formatted user requested action to the platform. If a confidence associated with the user requested action is below a predetermined threshold, such as below 60%, the multiplatform management system 150 can query the user to confirm that the user requested action should be performed.

In step 1040, the platform can perform the action. For example, when the platform is Intapp, the platform can create the timecard entry.

After performing the action, the multiplatform management system 150 can receive a natural language response from the user. The natural language response can contain a positive or negative feedback such as "thanks," or "incorrect," respectively. The multiplatform management system 150 can provide the feedback to the platforms involved in performing the action, so that when the feedback is positive, given the same natural language user request, the same action is more likely to be performed next time, or when the feedback is negative, given the same natural language request, the same action is less likely to be performed next time.

To select which action to perform, the multiplatform management system 150 can determine a first confidence level associated with a first action among the multiple actions and a second confidence level associated with a second action among the multiple actions. The multiplatform management system 150 can determine that the first confidence level is greater than the second confidence level and select the first action as the action. When the first confidence level is below a predetermined threshold, such as 50%, the multiplatform management system 150 can ask the user for a confirmation prior to performing the action.

The confirmation received from the user can affect the confidence level as well as which action is selected. Upon receiving the positive feedback, the multiplatform management system 150 can increase the first confidence level next time when the same natural language request is received. Upon receiving the negative feedback, the multiplatform management system 150 can decrease the first confidence level next time when the same natural language request is received.

To interpret the natural language request, the processor can obtain a natural language input from the user entered prior to the natural language request. The processor can interpret the natural language request based on the natural language input entered prior to the natural language request. For example, a first person pronoun such as "I" or "my" is interpreted based on who is logged in. A feedback such as "this is wrong" is interpreted to refer to the immediately preceding output from the multiplatform management system 150.

Computer

Figure 11:
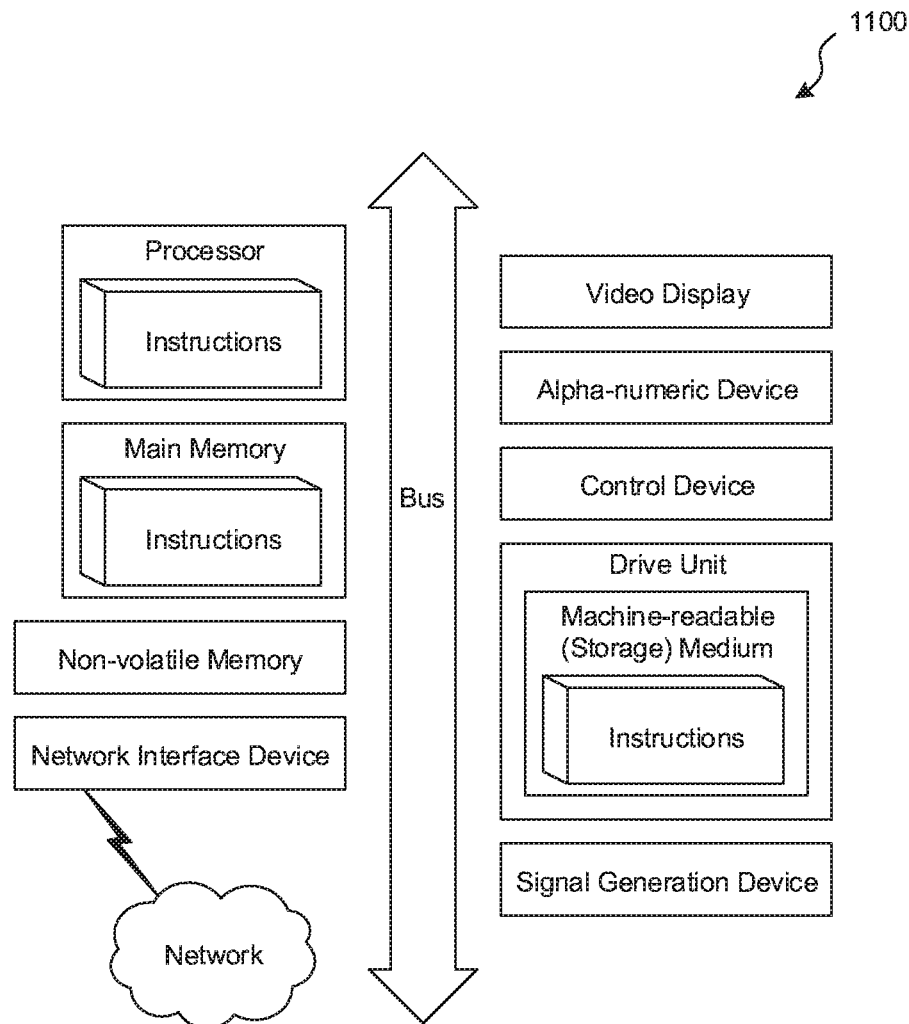
FIG. 11 is a diagrammatic representation of a machine in the example form of a computer system 1100 within which a set of instructions, for causing the machine to perform any one or more of the methodologies or platforms discussed herein, may be executed.

FIG. 11 is a diagrammatic representation of a machine in the example form of a computer system 1100 within which a set of instructions, for causing the machine to perform any one or more of the methodologies or platforms discussed herein, may be executed.

In the example of FIG. 11, the computer system 1100 includes a processor, memory, non-volatile memory, and an interface device. Various common components (e.g., cache memory) are omitted for illustrative simplicity. The computer system 1100 is intended to illustrate a hardware device on which any of the components described in the example of FIGS. 1-10 (and any other components described in this specification) can be implemented. The computer system 1100 can be of any applicable known or convenient type. The components of the computer system 1100 can be coupled together via a bus or through some other known or convenient device.

The processor of the computer system 1100 can perform any of the methods described in this application. The processor can execute instructions associated with the various platforms 102, 104, 106, 108, 160, 170, 180 in FIGS. 1A-1B; 430, 440, 450, 460 in FIGS. 4A-4C; etc. The processor can also execute instructions associated with the multiplatform management system 150 in FIGS. 1A-1B. The various platforms 102, 104, 106, 108, 160, 170, 180, 430, 440, 450, 460 as well as the multiplatform management system 150 can communicate with each other and the user, using the network of the computer system 1100. The video display of the computer system 1100 can present the user interface to the multiplatform management system 150.

This disclosure contemplates the computer system 1100 taking any suitable physical form. As an example and not by way of limitation, computer system 1100 may be an embedded computer system, a system-on-chip (SOC), a single-board computer system (SBC) (such as, for example, a computer-on-platform (COM) or system-on-platform (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 1100 may include one or more computer systems 1100; be unitary or distributed; span multiple locations; span multiple machines; or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 1100. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing an entire large program in memory may not even be possible. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 1100. The interface can include an analog modem, ISDN modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 11 reside in the interface.

In operation, the computer system 1100 can be controlled by operating system software that includes a file management system, such as a disk operating system. One example of operating system software with associated file management system software is the family of operating systems known as Windows® from Microsoft Corporation of Redmond, Wash., and its associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or platforms of the presently disclosed techniques and innovation.

In general, the routines executed to implement the embodiments of the disclosure may be implemented as part of an operating system or a specific application, component, program, object, platform or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD-ROMS), Digital Versatile Disks, (DVDs), etc.), among others, and transmission type media such as digital and analog communication links.

In some circumstances, operation of a memory device, such as a change in state from a binary one to a binary zero or vice versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice versa in a memory device may comprise a transformation, such as a physical transformation. Rather, the foregoing are intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

Remarks

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. A method comprising:
    obtaining a plurality of disparate platforms and a plurality of actions, wherein each action in the plurality of actions can be performed by at least one platform in the plurality of disparate platforms, wherein a platform in the plurality of disparate platforms cannot communicate with a remainder of the plurality of disparate platforms;

receiving a natural language request from a user by a groupware platform, wherein the groupware platform is a part of the plurality of disparate platforms;

based on the plurality of actions and the plurality of disparate platforms, deciding to send the natural language request from the user to a natural language processing platform, wherein the groupware platform and the natural language processing platform are not configured to communicate to each other;

formatting the natural language request into a formatted natural language request accepted by the natural language processing platform;

sending the formatted natural language request to the natural language processing platform;

interpreting, by the natural language processing platform, the natural language request to identify a user requested action associated with the natural language request;

based on the plurality of actions and the plurality of disparate platforms, determining the platform in the plurality of disparate platforms that can perform the user requested action, wherein the platform, the groupware platform and the natural language processing platform are not configured to communicate to each other;

formatting the user requested action into a formatted user requested action accepted by the platform;

sending the formatted user requested action to the platform; and performing the action.

2. The method of claim 1, comprising:

receiving a natural language response from the user in response to performing the action; and providing a feedback to the natural language processing platform, wherein the feedback is reinforcing when the natural language response comprises a positive feedback and the feedback is discouraging when the natural language response comprises a negative feedback.

3. The method of claim 1, the plurality of disparate platforms comprising the natural language processing platform, an image analysis platform, and a human capital management database.

4. The method of claim 1, the user requested action comprising creating an expense report, or requesting a vacation.

5. The method of claim 1, said determining the platform comprising:

determining the platform that upon performing the user requested action has received a positive feedback more frequently than the remainder of the plurality of disparate platforms.

6. A method comprising:

receiving, by a multiplatform management system, a natural language request from a user;

interfacing, by the multiplatform management system, with a plurality of disparate platforms including a natural language processing platform, wherein each platform in the plurality of disparate platforms is configured to perform an action in a plurality of actions, said interfacing comprising formatting the natural language request into a formatted natural language request accepted by the natural language processing platform, and forwarding the formatted natural language request to the natural language processing platform;

receiving a user requested action from the natural language processing platform;

facilitating communication between the plurality of disparate platforms by determining a platform in the plurality of disparate platforms that can perform the user requested action, formatting the user requested action into a formatted user requested action accepted by the platform and sending the formatted user requested action to the platform; and performing the action.

7. The method of claim 6, comprising:

receiving a natural language response from the user in response to performing the action; and providing a feedback to the natural language processing platform, wherein the feedback is reinforcing when the natural language response comprises a positive feedback and the feedback is discouraging when the natural language response comprises a negative feedback.

8. The method of claim 6, the plurality of disparate platforms comprising the natural language processing platform, an image analysis platform, and a human capital management database.

9. The method of claim 6, the user requested action comprising creating a timecard entry, or an active project query.

10. The method of claim 6, said determining the action comprising:

determining a first confidence level associated with a first action in the plurality of actions and a second confidence level associated with a second action in the plurality of actions;

determining that the first confidence level is greater than the second confidence level; and in response to said determining, selecting the first action as the action.

11. The method of claim 10, comprising:

when the first confidence level is below a predetermined threshold, asking the user for a confirmation prior to performing the action.

12. The method of claim 10, comprising:

upon receiving a positive feedback in response to selecting the first action, increasing the first confidence level; and upon receiving a negative feedback in response to selecting the first action, decreasing the first confidence level.

13. The method of claim 6, said interpreting the natural language request comprising:

obtaining a natural language input from the user entered prior to the natural language request; and interpreting the natural language request based on the natural language input entered prior to the natural language request.

14. A system comprising:

a groupware platform to receive a natural language request from a user and to forward the natural language request to a multiplatform management system;

the multiplatform management system to interface with a plurality of disparate platforms and to obtain a plurality of actions, each action in the plurality of actions can be performed by at least one platform in the plurality of disparate platforms, the multiplatform management system to receive the natural language request, to format the natural language request into a formatted natural language request accepted by a natural language processing platform, and to forward the formatted natural language request to the natural language processing platform;

the natural language processing platform to receive the formatted natural language request, to identify a user requested action associated with the natural language request, and to forward the identified user requested action to the multiplatform management system;

the multiplatform management system to facilitate communication between the plurality of disparate platforms by determining a platform in the plurality of disparate platforms that can perform the user requested action, formatting the user requested action into a formatted user requested action accepted by the platform and sending the formatted user requested action to the platform; and the platform to perform the action.

15. The system of claim 14, comprising:

the groupware platform to receive a natural language response from the user and to forward the natural language request to the multiplatform management system; and the multiplatform management system to provide a feedback to the natural language processing platform, wherein the feedback is reinforcing when the natural language response comprises a positive feedback and the feedback is discouraging when the natural language response comprises a negative feedback.

16. The system of claim 14, the multiplatform management system comprising:

a cloud elastic compute platform to receive a communication in a first programming language to determine a type of the communication, and based on the type of the communication to determine a second platform to which to send the communication; and a polyglot platform to receive the communication in the first programming language and the second platform from the cloud elastic compute platform, to translate the communication from the first programming language associated with a first platform to a second programming language associated with the second platform, and to send the translated communication to the second platform.

17. The system of claim 16, the type of communication comprising an image or a text.

18. The system of claim 14, the plurality of disparate platforms comprising a plurality of incompatible databases storing information regarding a workplace, or an image analysis platform to analyze an image received from the user.

19. The system of claim 14, the groupware platform comprising a user interface receiving a text or a spoken language.

20. The system of claim 14, comprising the groupware platform to:

enable a plurality of users to interact by a user interface associated with the groupware platform;

receive a user input from the user in the plurality of users;

determine whether the user input is directed to the groupware platform; and upon determining that the user input is directed to the groupware platform, forward the user input to the multiplatform management system.

* * * * *